(12) United States Patent
Bentley et al.

(10) Patent No.: US 8,266,775 B2
(45) Date of Patent: Sep. 18, 2012

(54) APPARATUS, SYSTEM, AND METHOD FOR INSTALLING CLAMPS

(76) Inventors: Phillip E. Bentley, Jacksonville, FL (US); Jay J. Stanford, St. Marys, GA (US)

( * ) Notice: Subject to any disclaimer, the term of this patent is extended or adjusted under 35 U.S.C. 154(b) by 604 days.

(21) Appl. No.: 12/381,727

(22) Filed: Mar. 16, 2009

(65) Prior Publication Data
US 2009/0313800 A1    Dec. 24, 2009

Related U.S. Application Data

(60) Provisional application No. 61/074,324, filed on Jun. 20, 2008.

(51) Int. Cl.
*B23P 19/04*    (2006.01)
*B25B 27/14*    (2006.01)
*B25B 7/02*    (2006.01)

(52) U.S. Cl. .............. 29/268; 81/418; 81/486; 29/271

(58) Field of Classification Search .............. 81/416, 81/418, 424.5, 419, 426, 426.5, 370, 485, 81/486; 29/268, 271
See application file for complete search history.

(56) References Cited

U.S. PATENT DOCUMENTS

| | | | | |
|---|---|---|---|---|
| 1,085,461 A * | 1/1914 | Michaelis | ........................ | 81/419 |
| 2,814,860 A * | 12/1957 | McCaleb | ........................ | 29/268 |
| 3,098,541 A * | 7/1963 | Kadas | .............................. | 81/419 |
| 3,571,894 A * | 3/1971 | Bilka | .............................. | 29/268 |
| 5,209,143 A * | 5/1993 | Sweet | .............................. | 81/9.3 |

* cited by examiner

*Primary Examiner* — Hadi Shakeri
(74) *Attorney, Agent, or Firm* — Arthur G. Yeager

(57) ABSTRACT

An apparatus, system, and method is provided for installing clamps. The system comprises pliers and an awl. The pliers have a pair of bifurcated jaws, each jaw generally narrow and of substantially equal width and thickness. A first jaw is pivotally mounted in relation to a second jaw such that spaces between furcations of the jaws substantially align as the jaws open and close. The distance between the jaws is adjustable, and the jaws can be releasably locked in position. The clamp is placed around a structure and an elongated shaft of the awl is passed through holes in ears of the clamp. The jaws compress the ears. The shaft is bracketed by the furcations of the jaws. The awl is removed, and a fastener inserted through the holes in the ears and secured to the clamp. At least five clamps can be secured together using just one bolt.

19 Claims, 6 Drawing Sheets

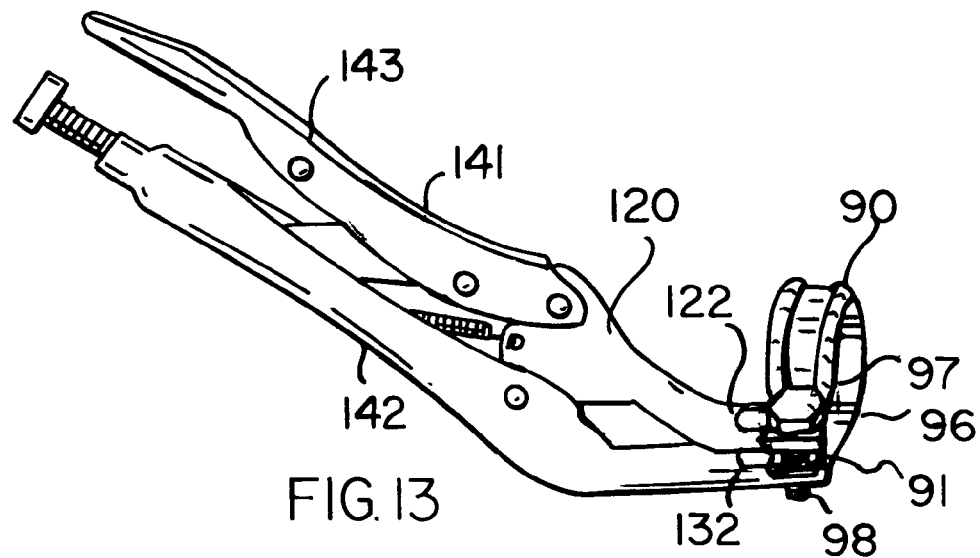
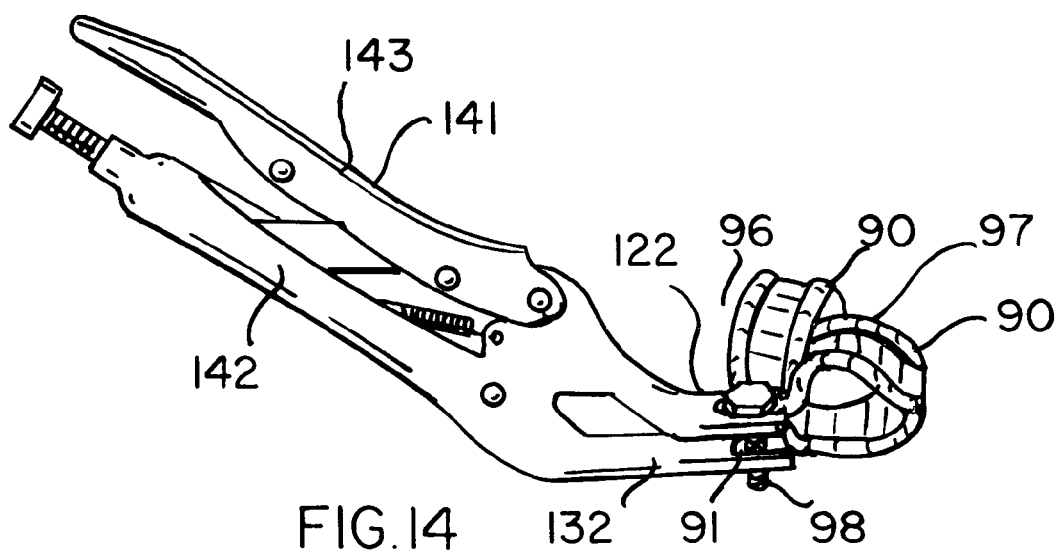

APPARATUS, SYSTEM, AND METHOD FOR INSTALLING CLAMPS

CROSS-REFERENCE TO RELATED APPLICATION

This application claims priority to provisional application 61/074,324, filed Jun. 20, 2008, entitled Cable Clamp Pliers.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to an apparatus, system, and method for securing clamps around hoses, bundled wiring, fuel lines, and the like, and particularly to such systems that comprise a pliers-like tool.

2. Relevant Art

Clamps are known that are used for securing hoses, bundled wiring, fuel lines, and the like and that are formed of a band of material shaped into a loop. Each end of the loop terminates in an ear having a centrally-located hole through which a fastener is passed to secure the clamp in place. An installer spreads the clamp far enough apart to position the looped portion of the clamp around a member, such as a hose. After placement, the ears of the clamp reside on a same side of the hose and are roughly aligned. A fastener, such as a bolt, is then passed through the holes in the ears and fastened to hold the clamp in place. The bolt can then be fastened by threading a nut onto a shaft of the bolt, by threading the bolt into a nearby threaded opening, or by some other similarly known method.

One such clamp is an Adel cushioned clamp. The looped portion of the Adel clamp is equipped with padding that rests adjacent the hose, or other member, around which the Adel clamp is placed. Adel clamps are generally manufactured with their ears sprung widely apart. The Adel cushioned clamp can be found described in U.S. Pat. No. 2,215,283.

When installing clamps, like Adel cushioned clamps, it can be difficult to draw the ears of the Adel clamp near enough together to align the holes in the ears so as to easily receive a fastener, such as a bolt. This difficulty can add time to installation projects. It can also prompt some installers to use other devices, such as tie wraps, in place of Adel clamps. Tie wraps, however, are prone to chafing and deterioration and often are not preferred for securing hoses and the like.

One tool used for installing Adel clamps is a pliers-like tool described in U.S. Pat. No. 2,814,860 ("Patent '860"). The tool has a pair of spaced jaws with each jaw attached to a handle. A head of a fastener, such as a bolt, is held in place in a lower jaw with a shaft of the bolt pointing upwardly toward an upper jaw. The lower jaw is thicker than the upper jaw so as to hold the bolt in place. Each jaw is bifurcated so that the shaft of the bolt passes between the furcations of each jaw when the jaws are closed. A locking pawl is incorporated into the lower jaw.

To install an Adel clamp, the shaft of the bolt is inserted through a hole in one ear of the Adel clamp and the jaws of the tool of Patent '860 are closed. With the bottom ear held in place by the bolt, the top ear is squeezed down over an end of the shaft of the bolt, with the shaft protruding through a hole in the top ear. As the jaws are further squeezed together, the top ear is brought down to the locking pawl where it is caught by the locking pawl. The Adel clamp is now secured between the jaws of the tool, with the shaft of the bolt extending through both ears of the Adel clamp.

With the tool of Patent '860, the locking pawl holds the ears of the Adel clamp at a predetermined distance from each other. This results in a bolt with a shorter shaft not extending through both ears of the Adel clamp, or not extending far enough through both ears of the Adel clamp, to allow the bolt to be fastened to the Adel clamp. In such an instance, the handles of the tool can be used to compress the jaws further together. Since this will cause the locking pawl to disengage, however, the handles must continue to be held with one hand while the bolt is fastened to the clamp using the other hand.

What is needed, then, is an apparatus, system, and method for installing clamps, like Adel clamps, that comprises a tool capable of holding in place bolts having both longer and shorter shafts so that an installer can use both hands to fasten a bolt, or other similar fastener, to an Adel clamp. The tool should also allow the shaft of the bolt to be inserted first through either ear of the Adel clamp, regardless of which jaw of the tool is holding that ear. The tool should also be capable of adjusting the distance at which the ears of the Adel clamp are held apart and be able to secure the ears in that position for easier installation. The tool should also have narrow upper and lower jaws both so that the tool can be used in either direction without the thickness of the jaw being a factor. The tool should also be capable of securing together more than three clamps using only one bolt.

SUMMARY OF THE INVENTION

In accord with the present invention, an apparatus, system, and method for installing clamps, like Adel clamps, is provided. The clamp installation system comprises pliers and an awl. The system is capable of holding in place bolts having both longer and shorter shafts so that an installer can use both hands to fasten a bolt, or other similar fastener, to an Adel clamp. The system also allows the shaft of the bolt to be inserted first through either ear of the Adel clamp, regardless of which jaw of the pliers is holding that ear. In addition, the pliers provided by the system are capable of adjusting the distance at which the ears of the Adel clamp are held apart. The pliers are also capable of securing the ears in that position for easier installation. The pliers also have narrow upper and lower jaws so that the pliers can be used in either direction without the thickness of the jaw being a factor. The system is further capable of securing together at least five clamps using only one bolt.

The pliers of the system comprise a spaced pair of bifurcated jaws for drawing together ears of a clamp, such as an Adel clamp, and holding those ears substantially in place within the jaws. Each jaw is of substantially equal width and thickness, with each jaw being narrow, although other configurations of the jaws are possible. A first jaw is pivotally mounted in relation to a second jaw such that a space between furcations of a first jaw substantially align with a space between furcations of a second jaw. This alignment of spaces substantially persists as the jaws are opened and closed. The furcations of the jaws are spaced widely enough apart to permit a shaft and not the head of a fastener, such as a bolt, to be passed therebetween. The jaws of the pliers can also be spaced at an adjustable distance apart and releasably locked in that position.

In various embodiments, the jaws of the pliers are positioned at an angle between approximately zero and ninety degrees relative to the handles. Pliers with jaws canted at a given angle relative to its handles can reach into areas that might be inaccessible to pliers with jaws canted at a different angle. This allows for the manufacture of a variety of angled pliers for use in various applications.

The system also comprises an awl having a handle attached to a narrow elongated shaft. The shaft of the awl is used for aligning holes in the ears of the Adel clamp. The shaft is dimensioned to pass between the furcations of the jaws of the pliers and also through the holes in the ears of the Adel clamp.

In most cases, the pliers and awl both are used to install the Adel clamp. First, the Adel clamp is placed around a member to which the Adel clamp is to be secured, such as a hose. Next, the awl is inserted through the ears of the Adel clamp. The pliers are then positioned with each jaw on a separate ear of the Adel clamp and the shaft of the awl bracketed by the furcations of each jaw. The jaws are then compressed, bringing the ears closer together. Once the desired distance between the ears is reached, the awl is removed from the ears. A fastener, such as a bolt, is then inserted through the holes in the ears and the fastener secured to the Adel clamp. It is possible to secure up to at least five Adel clamps together using just one bolt.

BRIEF DESCRIPTION OF DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 13 is a side perspective view of the pliers of FIG. 12 holding together ears of an Adel cushioned clamp with a fastener inserted through holes in the ears; and FIG. 14 is a side perspective view of the pliers of FIG. 12 holding together ears of two Adel cushioned clamps with a fastener inserted through holes in the ears.

DESCRIPTION

Figure 1:
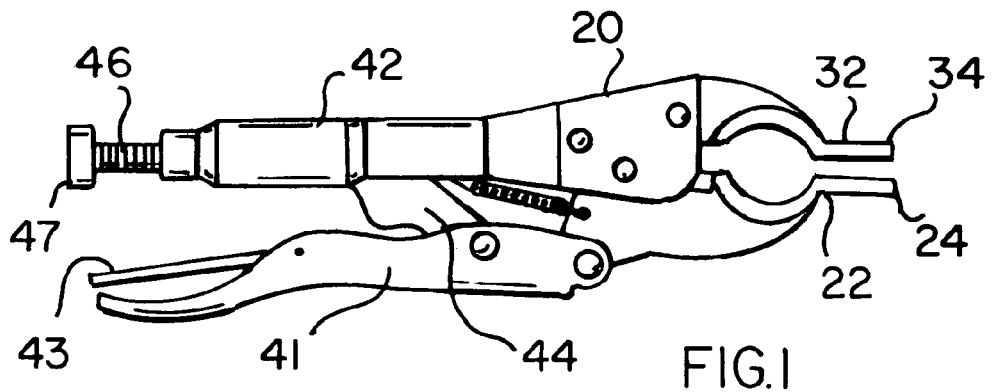
FIG. 1 is a side perspective view of pliers, in accord with the present invention.

Embodying the principles of the present invention is a system for installing clamps, such as Adel cushioned clamps. A preferred embodiment of the system comprises an awl and pliers, depicted in FIGS. 1-11, and designated generally by reference numeral 10.

Figure 2:
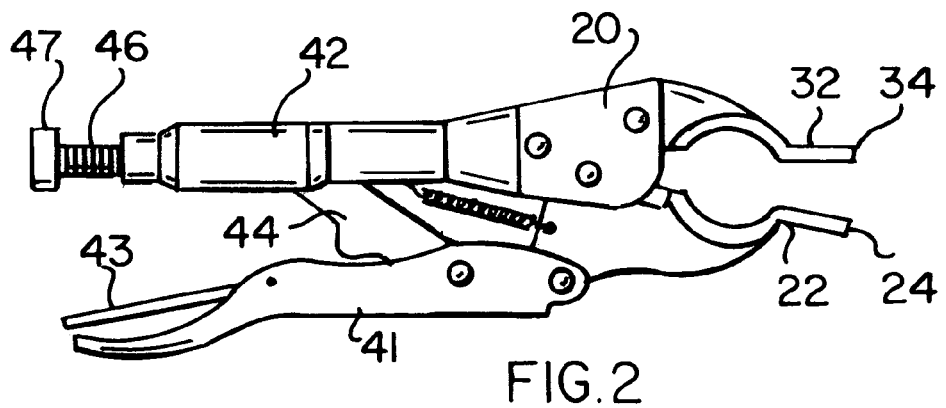
FIG. 2 is a side view of the pliers shown in FIG. 1.
Figure 3:
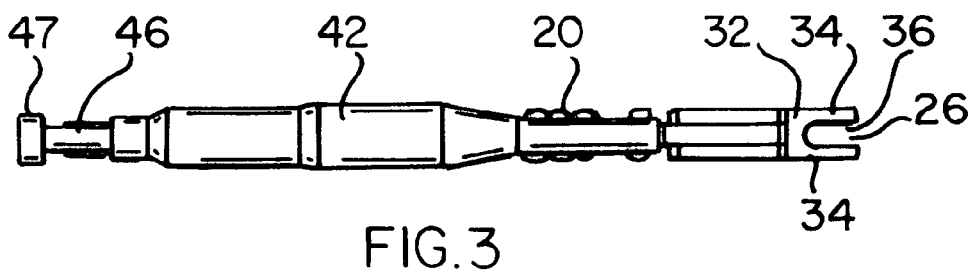
FIG. 3 is a top plan view of FIG. 2.

Referring now to FIGS. 1-3, the clamp installation system 10 includes pliers 20 for drawing ears 91 (see FIGS. 5 and 7-11) of an Adel clamp 90 (see FIGS. 5 and 7-11) more closely together and holding the ears 91 generally in place. With the ears 91 held in place, a fastener, such as a bolt 96 (see FIGS. 8 and 11), can be inserted through a hole 92 (see FIGS. 8, 10, and 11) in each of the ears 91 of the Adel clamp 90 to secure the Adel clamp 90 substantially in place, as described below with reference to FIGS. 5 and 8. The pliers 20 are also used to remove the bolt 96 from the Adel clamp 90, as described below with reference to FIG. 8. In the present embodiment, the pliers 20 are envisioned to be made of steel. In alternate embodiments, other sturdy, durable materials can be used to construct pliers 20. Note that the system 10 can be used to install other types of clamps similar to Adel cushioned clamps 90. Some of these types of clamps may or may not be padded. Note also that Adel clamps 90 are generally manufactured with ears 91 of the Adel clamp 90 sprung widely apart.

Continuing with FIGS. 1-3, the pliers 20 comprise a spaced pair of jaws 22, 32, a spaced pair of elongated handles 41, 42, a releasably locking mechanism 44 (see FIGS. 1 and 2), an elongated unlocking lever 43 (see FIGS. 1 and 2), and an adjustment shaft 46. An end of a first handle 41 (see FIGS. 1 and 2) is pivotally attached to an end of a first jaw 22 (see FIGS. 1 and 2). An end of a second handle 42 is rigidly attached to an end of a second jaw 32. Pulling the first handle 41 toward the second handle 42 causes the first jaw 22 to pivot closer to the second jaw 32, thereby allowing the jaws 22, 32 to close together, as is known in the art. When the jaws 22, 32 are closed together, longitudinal axes of the jaws 22, 32 are substantially aligned with longitudinal axes of the handles 41, 42. Releasing pressure on the handles 41, 42 causes the locking mechanism 44 to urge the handles 41, 42 apart, which urges the jaws 22, 32 apart, as is also known in the art. Note that in alternate embodiments, handles 41, 42 of pliers 20 can be of various lengths and shapes to accommodate unique applications.

Still referring to FIGS. 1-3, the locking mechanism 44 is like that employed by a vise grip. The locking mechanism 44 is positioned between the handles 41, 42 and used to releasably lock the jaws 22, 32 together, as is known in the art. The unlocking lever 43 is attached to the first handle 41. The lever 43, like that employed by a vise grip, works with the locking mechanism 44 to unlock the jaws 22, 32, as is known in the art. Specifically, moving the unlocking lever 43 toward the second handle 42 unlocks the jaws 22, 32 of the pliers 20.

Continuing with FIGS. 1-3, the adjustment shaft 46, substantially like that employed by a vise grip, is threaded into the second handle 42. One end of the shaft 46 contacts a portion of the locking mechanism 44 so that when the shaft 46 is rotated clockwise, the locking mechanism 44 draws the jaws 22, 32 closer together and when the shaft 46 is rotated counterclockwise, the locking mechanism 44 widens the jaws 22, 32, as is known in the art. A knob 47 formed integral with an opposing end of the adjustment shaft 46 is used to rotate the shaft 46. As with a vise grip, the adjustment shaft 46 adjustably imposes a minimum spatial limit between the jaws 22, 32 of the pliers 20. When the handles 41, 42 are brought together and compressed, the locking mechanism 44 locks the jaws 22, 32 in place at this minimum spatial limit, as is known in the art. Note that in alternate embodiments, other ways of closing, widening, and releasably locking jaws 22, 32 of pliers 20 can be used.

Figure 6:
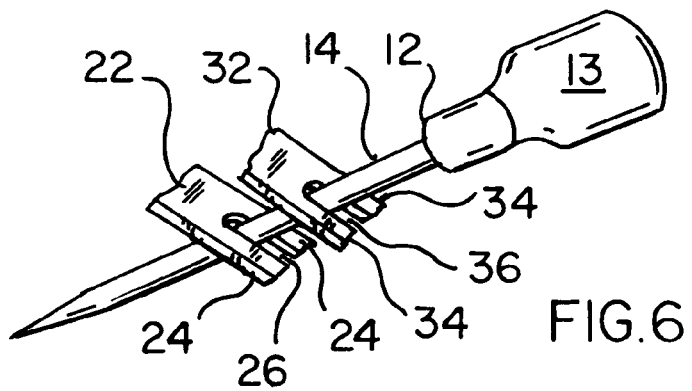
FIG. 6 is a perspective view of the awl of FIG. 4 inserted between furcations of each jaw of the pliers of FIG. 1.
Figure 8:
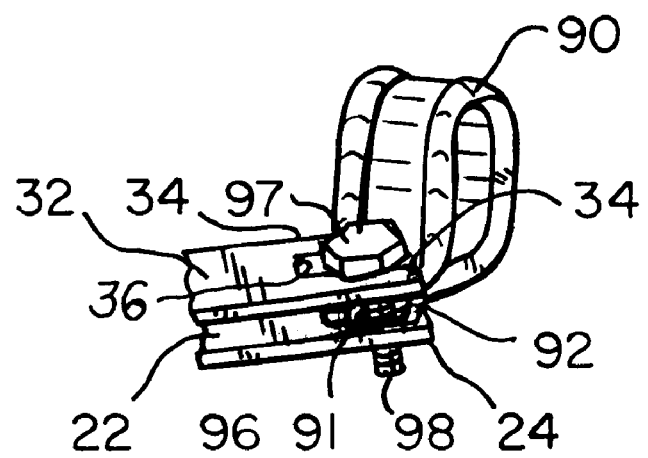
FIG. 8 is a perspective view of just the jaws of the pliers of FIG. 1 holding together ears of an Adel cushioned clamp with a fastener passed through the holes in the ears.
Figure 11:
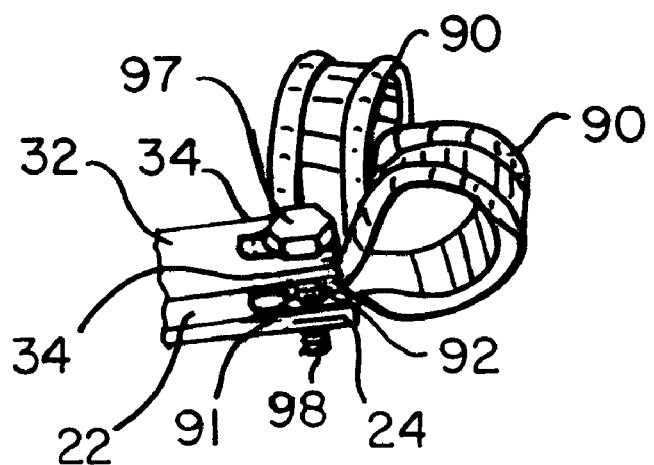
FIG. 11 is a perspective view of just the jaws of the pliers of FIG. 1 holding together ears of two Adel cushioned clamps with a fastener inserted through holes in the ears.

Referring now to FIGS. 3 and 6, each of the jaws 22, 32 of the pliers 20 (see FIG. 3) is bifurcated. A space 26 between furcations 24 (see FIG. 6) of the first jaw 22 (see FIG. 6) generally align with a space 36 between furctions 34 of the second jaw 32. The spaces 26, 36 remain substantially aligned as the jaws 22, 32 of the pliers 20 are opened and closed. The furcations 24, 34 of the jaws 22, 32 are spaced widely enough to allow a shaft 98 of the bolt 96 to be inserted therebetween, as can be seen in FIGS. 8 and 11. The furcations 24, 34 are substantially equal in thickness as well as in width. Note that in alternate embodiments, furcations 24, 34 of jaws 22, 32 of pliers 20 can be constructed to create a wider or narrower space 26, 36 between each of the jaws 22, 32 as necessary to accommodate various forms of fasteners. Note also that in alternate embodiments, furcations 24, 34 can be made thicker, thinner, wider, or narrower than in the present embodiment. Note further that in alternate embodiments, furcations 24 of a first jaw 22 can be dimensioned differently than furcations 34 of a second jaw 32.

Figure 4:
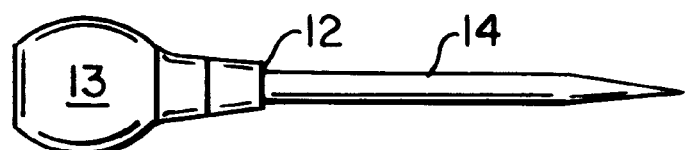
FIG. 4 is a side view of an awl, in accord with the present invention.

Referring now to FIG. 4, the clamp installation system 10 also includes an awl 12. The awl 12 has a handle 13 attached to a narrow elongated shaft 14. The shaft 14 of the awl 12 is used for aligning the holes 92 (see FIGS. 8, 10, and 11) in the ears 91 (see FIGS. 5 and 7-11) of the Adel clamp 90 (see FIGS. 5 and 7-11), as described below with reference to FIGS. 5-8. The shaft 14 of the awl 12 is dimensioned to pass between the furcations 24, 34 (see FIGS. 3, 6, 8, and 11) of the jaws 22, 32 (see FIGS. 1-3, 5-9, and 11) of the pliers 20 (see FIGS. 1-3, 5, 7, 9, and 10) and also through the holes 92 in the ears 91 of the Adel clamp 90.

Regarding FIG. 4, in the present embodiment, the shaft 14 of the awl 12 is envisioned to be made of steel, while the handle 13 of the awl 12 is envisioned to be made of wood. In alternate embodiments, other sturdy, durable materials can be used to construct a handle 13 and a shaft 14 of an awl 12. Note that for optimal performance of the awl 12, it is envisioned that a diameter of the shaft 14 of the awl 12 will be approximately 0.01 of an inch smaller than a diameter of the holes 92 in the ears 91 of the Adel clamp 90. An awl 12 with a shaft 14 of a different diameter, however, will also function well as long as the shaft 14 fits within the holes 92 in the ears 91.

Referring now to FIGS. 5-11, to secure the Adel clamp 90 (see FIGS. 5 and 7-11) to a structure, such as a hose on an aircraft, the Adel clamp 90 is first placed around the hose (not shown). Occasionally, the holes 92 (see FIGS. 8, 10, and 11) in the ears 91 (see FIGS. 5 and 7-11) of the Adel clamp 90 will be substantially aligned after the Adel clamp 90 is placed around the hose and the pliers 20 (see FIGS. 5, 7, 9, and 10) are used to compress the ears 91 closer together, as described below with reference to FIGS. 5 and 8. In these instances, only the pliers 20 are required to secure the Adel clamp 90 to the hose. More likely, however, the holes 92 in the ears 91 will not be substantially aligned. In that event, the awl 12 (see FIGS. 6, 7, and 9) will also be needed to install the Adel clamp 90 or to make installation of the Adel clamp 90 easier, as described below with reference to FIGS. 5-8. In some cases, it is necessary to secure multiple Adel clamps 90 using the same bolt 96, as described below with reference to FIGS. 9-11. In that case, the awl 12 and the pliers 20 are used together to secure the Adel clamps 90.

Figure 5:
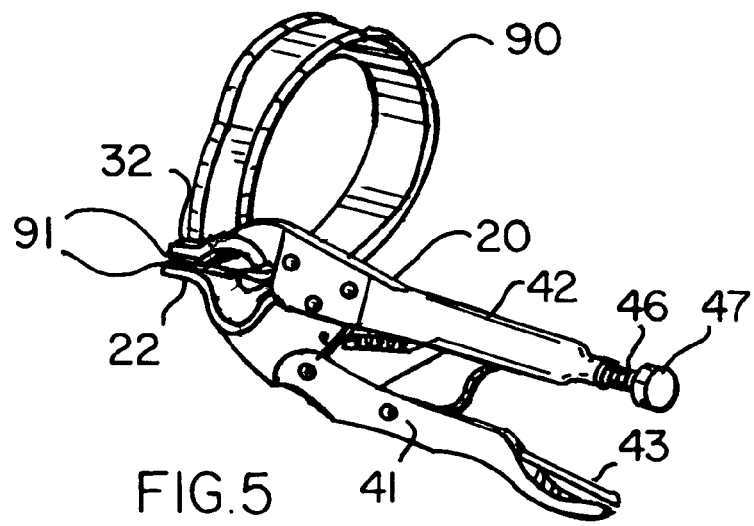
FIG. 5 is a side perspective view of the pliers of FIG. 1 holding together ears of an Adel cushioned clamp.

Referring now to FIGS. 5 and 8, after the Adel clamp 90 has been placed around the hose (not shown), the ears 91 of the Adel clamp 90 are compressed closer together and the holes 92 (see FIG. 8) in the ears 91 aligned. The ears 91 can be aligned by using the awl 12 (see FIGS. 6, 7, and 9) first, as described below with reference to FIGS. 5-8, or the ears 91 can be compressed first using the pliers 20 (see FIG. 5).

Continuing with FIGS. 5 and 8, to first compress the ears 91 closer together, the first jaw 22 (see FIG. 5) of the pliers 20 is placed on an outer surface of a first ear 91 and the second jaw 32 (see FIG. 5) is placed on an outer surface of a second ear 91 such that the ears 91 lie between the jaws 22, 32. The space 26, 36 (see FIGS. 3 and 6) between the furcations 24, 34 (see FIGS. 3 and 6) of each jaw 22, 32 are substantially aligned with the holes 92 in the ears 91. The adjustment shaft 46 (see FIG. 5) is rotated as needed to adjust the minimum spatial limit between the jaws 22, 32, as described above with reference to FIGS. 1-3. The handles 41, 42 (see FIG. 5) of the pliers 20 are then compressed together until the locking mechanism 44 (see FIG. 5) engages to lock the jaws 22, 32 in place, as described above with reference to FIGS. 1-3. This secures the ears 91 of the Adel clamp 90 in place in preparation for inserting the bolt 96 (see FIG. 8) through the holes 92 in the ears 91, allowing an installer to have both hands free to install the bolt 96.

Still referring to FIGS. 5 and 8, if the holes 92 are substantially aligned, then the bolt 96 is now inserted. To insert the bolt 96, the shaft 98 (see FIG. 8) of the bolt 96 is inserted through the space 26, 36 between the furcations 24, 34 of one jaw 22, 32 of the pliers 20, through the substantially aligned holes 92 in the ears 91 of the Adel clamp 90, and through the space 26, 36 between the furcations 24, 34 of the other jaw 22, 32. The bolt 96 is then secured by using a nut (not shown), by threading the bolt into an adjacent threaded opening, or by some other means known in the art. The Adel clamp 90 is now secured in place on the hose. Note that the shaft 98 of the bolt 96 can be inserted into either ear 91 first, allowing the bolt 96 to be secured in the Adel clamp 90 in either of two orientations.

Continuing with FIGS. 5 and 8, the pliers 20 are then unlocked from the Adel clamp 90 and removed. To unlock the pliers 20, the unlocking lever 43 (see FIG. 5) of the pliers 20 is moved toward the second handle 42. This unlocks the jaws 22, 32 from the Adel clamp 90, as described above with reference to FIGS. 1-3. To remove the pliers 20 from the Adel clamp 90, the pliers 20 are pulled sideways out from under a head 97 (see FIG. 8) of the bolt 96.

Figure 7:
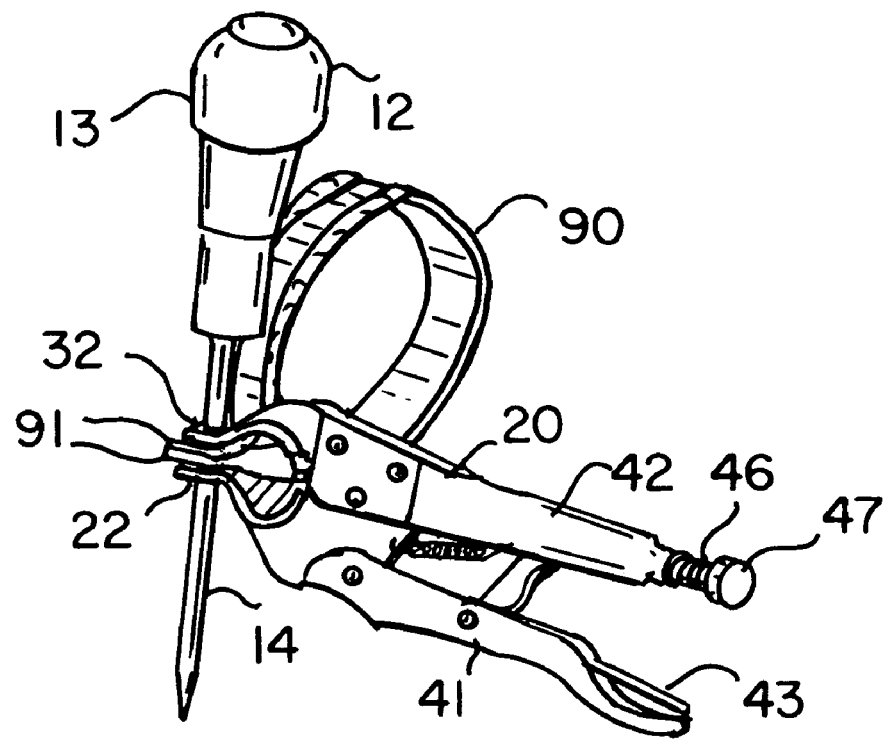
FIG. 7 is a side perspective view of the pliers of FIG. 1 holding together ears of an Adel cushioned clamp with the awl of FIG. 4 inserted through holes in the ears.

Referring now to FIGS. 5-8, oftentimes when the pliers 20 (see FIGS. 5 and 7) are used to first compress the ears 91 (see FIGS. 5, 7, and 8) of the Adel clamp 90 (see FIGS. 5, 7, and 8) closer together and the jaws 22, 32 (see FIGS. 5, 7, and 8) of the pliers 20 are locked in place, as described above with reference to FIGS. 5 and 8, the holes 92 (see FIG. 8) in the ears 91 will be misaligned. In this instance, the awl 12 (see FIGS. 6 and 7) is used to align the holes 92 so that the bolt 96 (see FIG. 8) can be inserted therethrough. To do so, the shaft 14 (see FIGS. 6 and 7) of the awl 12 is inserted through the space 26, 36 (see FIG. 6) between the furcations 24, 34 (see FIG. 6) of the one jaw 22, 32 of the pliers 20, through the misaligned holes 92 in the ears 91 of the Adel clamp 90, and through the space 26, 36 between the furcations 24, 34 of the other jaw 22, 32. The act of inserting the awl 12 through the holes 92 can result in the holes 92 aligning. If this is not the case, however, then the awl 12 is moved back and forth within the holes 92 until the holes 92 become aligned. The awl 12 is then withdrawn from the holes 92 of the Adel clamp 90. The bolt 96 can now be inserted within the holes 92 and used to secure the Adel clamp 90 in place and the pliers 20 removed from the Adel clamp 90, as described above with reference to FIGS. 5 and 8.

Continuing with FIGS. 5-8, another method for securing the Adel clamp 90 to the hose (not shown) involves first placing the Adel clamp 90 around the hose and then inserting the awl 14 through both of the holes 92 in the ears 91 of the Adel clamp 90. Next, the pliers 20 are placed on the ears 91 of the Adel clamp 90, as described above with reference to FIGS. 5 and 8, with the spaces 26, 36 between the furcations 24, 34 of the jaws 22, 32 substantially aligned with the holes 92 and the furcations 24, 34 of each jaw 22, 32 bracketing the shaft 14 of the awl 12. The pliers 20 are then adjusted and locked into place, as described above with reference to FIGS. 5 and 8. If the holes 92 in the ears 91 are misaligned, then the awl 12 is moved back and forth within the holes 92 to align the holes 92, as described above. Once the holes 92 are aligned, the awl 12 is withdrawn from the holes 92. The bolt 96 can now be inserted within the holes 92 and used to secure the Adel clamp 90 in place and the pliers 20 removed from the Adel clamp 90, as described above with reference to FIGS. 5 and 8.

Referring now to FIG. 8, when the head 97 of the bolt 96 fits within the space 26, 36 (see FIG. 6) between the furcations 24, 34 (see FIG. 6) of each jaw 22, 32 of the pliers 20 (see FIGS. 5 and 7), the bolt 96 is removed from the Adel clamp 90 using the following method. To begin, the first jaw 22 of the pliers 20 is placed on an outer surface of the first ear 91 and the second jaw 32 is placed on an outer surface of the second ear 91 such that the ears 91 are positioned between the jaws 22, 32 and the head 97 of the bolt 96 is aligned between the furcations 24, 34 of the jaws 22, 32. The handles 41, 42 (see FIGS. 5 and 7) of the pliers 20 are then used to lock the jaws 22, 32, as described above with reference to FIGS. 5 and 8. The bolt 96 can now be removed from the Adel clamp 90 by unfastening the bolt 96 and withdrawing the bolt 96 from the ears 91 of the Adel clamp 90. The pliers 20 are then unlocked and removed from the Adel clamp 90, as described above with reference to FIGS. 5 and 8.

Continuing with FIG. 8, when the head 97 of the bolt 96 will not fit within the space 26, 36 between the furcations 24, 34 of each jaw 22, 32, the bolt 96 is removed from the Adel clamp 90 using the following method. To begin, the bolt 96 is first loosened so that the bolt 96 can later be moved up and down within the ears 91 of the Adel clamp 90. Next, a portion of the first jaw 22 of the pliers 20 is placed on the outer surface of the first ear 91 and a portion of the second jaw 32 is placed on the outer surface of the second ear 91 such that the ears 91 lie between the jaws 22, 32. At this point, the jaws 22, 32 will have only a small purchase on the respective ears 91.

Still referring to FIG. 8, now the handles 41, 42 of the pliers 20 are repeatedly worked together and apart as the jaws 22, 32 are pushed farther onto the ears 91 to gain a better purchase thereon. A respective jaw 22, 32 is pushed onto the ear 91 proximate to the head 97 of the bolt 96 such that the jaw 22, 32 moves between the head 97 of the bolt 96 and the proximate ear 91. Similarly, a respective jaw 22, 32 is pushed onto the ear 91 proximate to a portion of the shaft 98 of the bolt 96 distal from the head 97. If a nut (or other such item) is secured to the shaft 98, the respective jaw 22, 32 is moved between the nut and the ear 91 proximate to the nut. When enough of the jaws 22, 32 have been pushed onto the ears 91 to gain a sufficient purchase thereon, so as to remain in place, the jaws 22, 32 are locked there, as described above with reference to FIGS. 5 and 8.

Continuing with FIG. 8, the bolt 96 can now be removed from the Adel clamp 90 by unfastening the bolt 96 and withdrawing the bolt 96 from the ears 91 of the Adel clamp 90. The pliers 20 are then unlocked and removed from the Adel clamp 90, as described above with reference to FIGS. 5 and 8.

Figure 9:
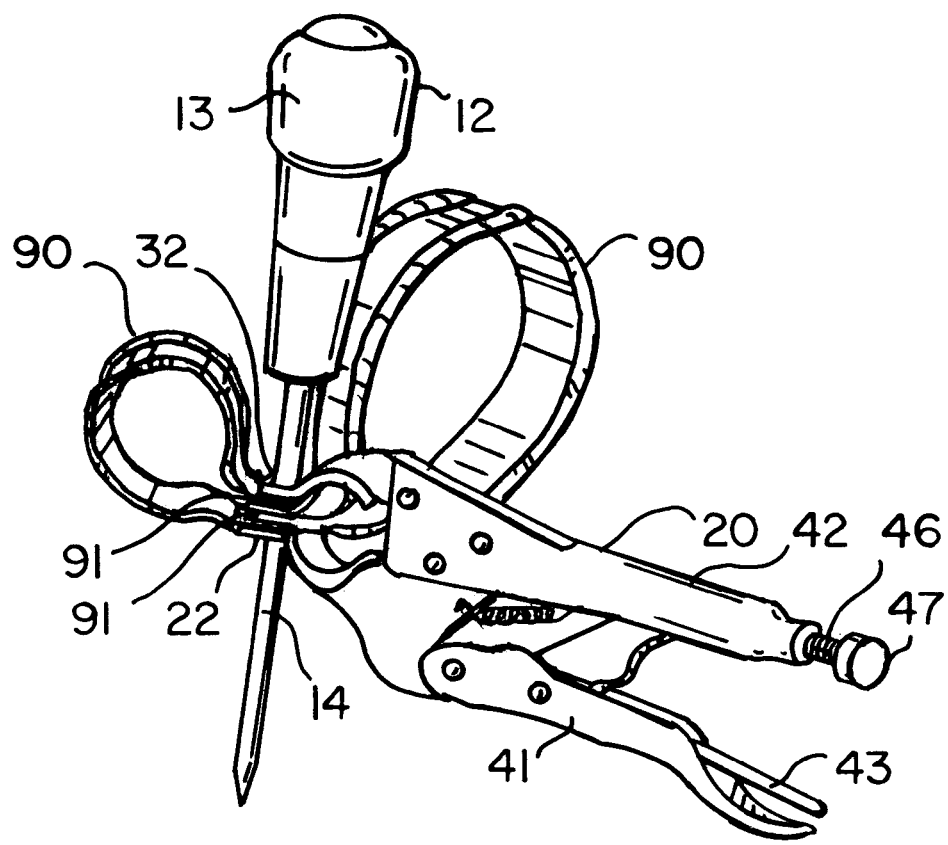
FIG. 9 is a side perspective view of the pliers of FIG. 1 holding together ears of two Adel cushioned clamps with the awl of FIG. 4 inserted through holes in the ears.
Figure 10:
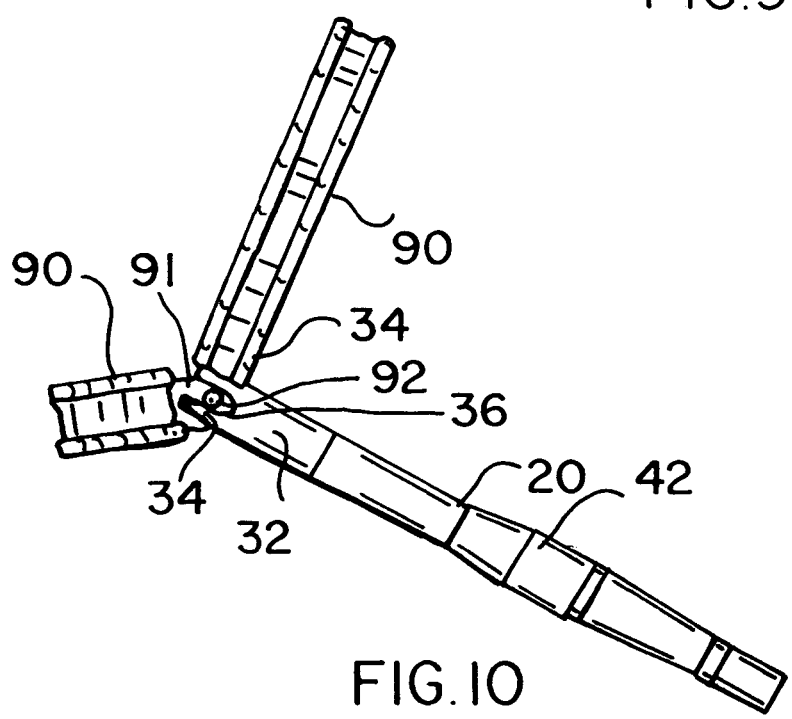
FIG. 10 is a top perspective view of FIG. 9 with the awl removed.

Referring now to FIGS. 9-11, the clamp installation system 10 can also secure multiple Adel clamps 90 using just one bolt 96 (see FIG. 11). The primary difference between securing just one Adel clamp 90 with one bolt 96 and securing multiple Adel clamps 90 with one bolt 96 is that instead of aligning the holes 92 (see FIGS. 10 and 11) in the ears 91 of just one Adel clamp 90 and placing the bolt 96 through the holes 92 in just those ears 91, the holes 92 in the ears 91 of multiple Adel clamps 90 are aligned and the bolt 96 is placed through the holes 92 in the ears of all of the Adel clamps 90. Note that although FIGS. 9-11 show only two Adel clamps 90 being secured using a single bolt 96, it is possible to secure up to at least five Adel clamps 90 using the single bolt 96.

Continuing with FIGS. 9-11, to secure two Adel clamps 90 using one bolt 96, the ears 91 of the two Adel clamps 90 are positioned such that the holes 92 in the ears 91 of both of the Adel clamps 90 are roughly aligned. The shaft 14 (see FIG. 9) of the awl 12 (see FIG. 9) is then passed through all of the holes 92 in the ears 91 of the Adel clamps 90. The first jaw 22 (see FIGS. 9 and 11) of the pliers 20 (see FIGS. 9 and 10) is placed on an outer surface of a lowermost ear 91 and the second jaw 32 is placed on an outer surface of an uppermost ear 91 such that all of the ears 91 lie between the jaws 22, 32. The space 26, 36 (see FIGS. 3 and 6) between the furcations 24, 34 (see FIGS. 3 and 6) of each jaw 22, 32 are substantially aligned with the holes 92 in the ears 91, with the furcations 24, 34 of each jaw 22, 32 bracketing the shaft 14 of the awl 12.

Still referring to FIGS. 9-11, the adjustment shaft 46 (see FIG. 9) of the pliers 20 is rotated as needed to adjust the minimum spatial limit between the jaws 22, 32, as described above with reference to FIGS. 1-3. The handles 41, 42 (see FIG. 9) of the pliers 20 are then compressed together until the locking mechanism 44 (see FIG. 9) engages to lock the jaws 22, 32 in place, as described above with reference to FIGS. 1-3. This secures the ears 91 of the Adel clamps 90 in place in preparation for inserting the bolt 96 through the holes 92 in the ears 91.

Continuing with FIGS. 9-11, after the jaws 22, 32 of the pliers 20 have been locked in place, the holes 92 can be aligned by moving the awl 12 back and forth within the holes 92 as needed. The awl 12 is then withdrawn from the holes 92 of the Adel clamp 90. The bolt 96 is now inserted within the holes 92 and used to secure both of the Adel clamps 90 in place and the pliers 20 removed from the Adel clamps 90, as described above with reference to FIGS. 5 and 8.

Still referring to FIGS. 9-11, the bolt 96 is removed from the Adel clamps 90 principally as described above with reference to FIG. 8.

Figure 12:
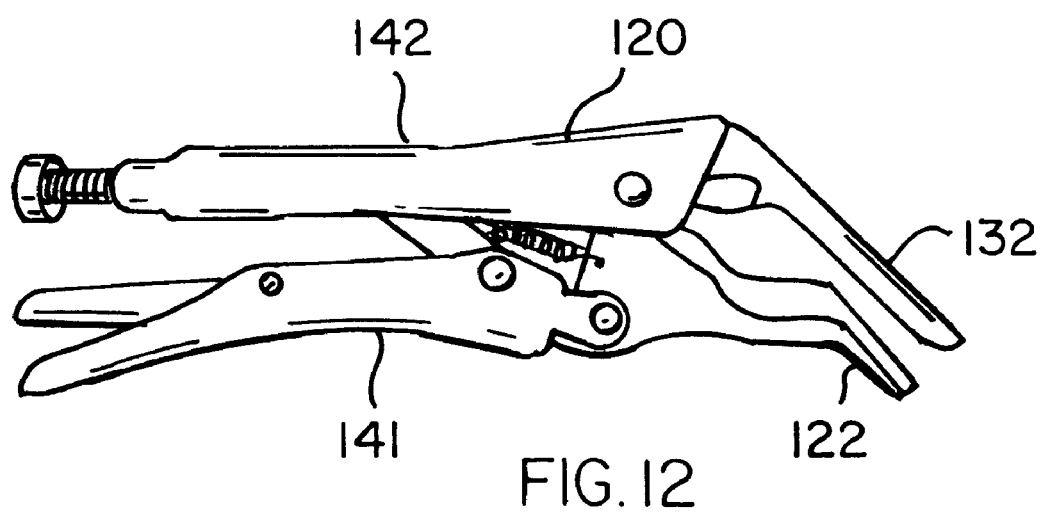
FIG. 12 is a side perspective view of a second embodiment of pliers, in accord with the present invention.

FIGS. 12-14 depict a second preferred embodiment of pliers 120 used with the clamp installation system 10, in accord with the present invention.

Referring now to FIGS. 12-14, the pliers 120 include jaws 122, 132 attached to handles 141, 142 at an angle of approximately forty degrees relative to the handles 141, 142. This allows the jaws 122, 132 of the pliers 120 to reach into areas inaccessible to non-angled pliers 20 (see FIGS. 1-3 and 5-11). In all other respects, the pliers 120 function substantially the same as the non-angled pliers 20 of the first preferred embodiment and can be used with the awl 12 (see FIGS. 4, 6, 7, and 9) for securing either one Adel clamp 90 or multiple Adel clamps 90. Note that in alternate embodiments, pliers 120 can have jaws 122, 132 attached to handles 141, 142 at various angles between approximately zero and ninety degrees relative to the handles 141, 142. Note also that pliers 120 with jaws 122, 132 canted at a given angle are able to reach into areas that might be inaccessible to pliers 120 with jaws 122, 132 canted at a different angle, allowing for the manufacture of a variety of angled pliers 120 for use in various applications.

While the invention has been described with respect to certain specific embodiments, it will be appreciated that many modifications and changes may be made by those skilled in the art without departing from the spirit of the invention. It is intended, therefore, that the appended claims cover all such modifications and changes as fall within the true spirit and scope of the invention.

What is claimed as new and what it is desired to secure by Letters Patent of the United States is:

1. In combination a tool for installing a clamp for receiving an elongated fastener, the combination comprising:
    an elongated fastener having a threaded shaft and a head;
    a clamp formed of a looped band having opposing ears, each said ear having a hole;
    spaced first and second bifurcated jaws for drawing said ears of said clamp more closely together and holding said ears substantially in place between said jaws,
    said first jaw being pivotally mounted in relation to said second jaw such that a space between furcation of said first jaw substantially aligns with a space between furcations of said second jaw with said alignment of said spaces substantially persisting as said jaws are opened and closed, each said space of each said jaw being substantially equal to permit passage of said shaft and non-passage of said head of said threaded fastener which engages an outer surface of one of said jaws,
    said furcations of said jaws being spaced sufficiently wide to permit insertion of said shaft and not said head of said fastener therebetween; and wherein said head of said fastener being located generally adjacent to and engaging an outer surface of said one of said jaws opposing an inner surface thereof where said inner surface is proximate to an inner surface of another said jaw, and said shaft of said fastener for securing together said ears of said clamp passing through said hole in each said ear that is held in place by said jaws,
    a spaced pair of handles, each said handle attached to a proximate end of one of said laws such that urging said handles together urges said jaws together and urging said handles apart urges said jaws apart, and
    said furcations of said jaws being substantially equal in thickness and substantially equal in width.

2. The tool recited in claim 1 wherein said jaws are positioned at an angle between approximately zero and ninety degrees relative to said handles.

3. The tool recited in claim 2 further comprising means for adjustably imposing a minimum spatial limit between said jaws such that compression of said jaws to substantially said spatial limit releasably locks said jaws in place at substantially said spatial limit.

4. The tool recited in claim 1 further comprising means for adjustably imposing a minimum spatial limit between said jaws such that compression of said jaws to substantially said spatial limit releasably locks said jaws in place at substantially said spatial limit.

5. The tool recited in claim 4 wherein said jaws are positioned at an angle between approximately zero and ninety degrees relative to said handles.

6. The tool recited in claim 1 wherein said space in each said jaw is substantially equal in length.

7. A system for installing clamps that are formed of a looped band having opposing perforated ears for receiving an elongated fastener therethrough comprising:
    an elongated fastener having a threaded shaft and a head;
    a clamp having opposing ears, each said ear having a hole therethrough;
    an awl for aligning said hole in a first said ear of said clamp with said hole in a second ear of said clamp and removal prior to insertion of said shaft of said fastener therethrough;
    a tool for holding said ears of said clamp, the tool including;
    spaced first and second bifurcated jaws for drawing said ears more closely together and holding said ears substantially in place between said jaws, said first jaw pivotally mounted in relation to said second jaw such that a space between furcations of said first jaw substantially aligns with a space between furcations of said second jaw with said alignment of said spaces substantially persisting as said jaws are opened and closed, and said furcations of said jaws spaced sufficiently wide to permit insertion of said shaft and not said head of said fastener therebetween as well as a shaft of said awl therebetween;
    said furcations of said laws being substantially equal in thickness and substantially equal in width;
    a spaced pair of handles, each said handle attached to a proximate end of each said jaw such that urging said handles together urges said jaws together and urging said handles apart urges said jaws apart; and wherein
    said head of said fastener being located generally adjacent to and engaging an outer surface of one of said jaws opposed to an inner surface thereof where said inner surface is proximate to an inner surface of another said jaw, and said shaft of said fastener passes through said hole in each said ear aligned by said awl and held in place by said jaws.

8. The system recited in claim 7 wherein said tool further comprises means for adjustably imposing a minimum spatial limit between said jaws such that compression of said jaws to substantially said spatial limit releasably locks said jaws in place at substantially said spatial limit.

9. The system recited in claim 8 wherein said jaws are positioned at an angle between approximately zero and ninety degrees relative to said handles.

10. The system recited in claim 7 wherein said jaws are positioned at an angle between approximately zero and ninety degrees relative to said handles.

11. A method for installing clamps that are formed of a looped band having opposing perforated ears for receiving an elongated fastener therethrough comprising the steps of:
    A) providing a clamp with a pair of spaced ears, each ear having a centrally-located hole;
    B) providing an elongated fastener having a head and a threaded shaft and providing a threaded member for receiving the threaded shaft of the fastener, the fastener and threaded member fastening together the ears of the clamp;
    C) providing a tool for drawing ears of a clamp more closely together and holding the ears substantially in place, the tool having a spaced pair of bifurcated jaws with a handle attached to a proximate end of each of the jaws, and a first jaw pivotally mounted in relation to a second jaw such that a space between furcations of the first jaw substantially aligns with a space between furcations of the second jaw with the alignment of the spaces substantially persisting as the jaws are opened and closed;

D) positioning the clamp around a member to which the clamp is to secure;

E) placing a first jaw of the tool on an outer surface of a first ear and a second jaw on an outer surface of a second ear such that the ears lie between the laws, with a space between furcations of each jaw substantially aligned with the holes of the ears of the clamp;

F) compressing the jaws of the tool to draw the ears of the clamp more closely together; and then G) inserting the fastener through the holes in the ears of the clamp with the head engaging the outer surface of one of the laws and threadedly securing the threaded member onto the threaded shaft of the fastener to hold the clamp in place; and then H) releasing the jaws of the tool from the clamp and removing the tool from the clamp.

12. The method recited in claim 11 further comprising the steps of:

I) providing an awl with a shaft for aligning a hole in a first ear of the clamp with a hole in a second ear of the clamp;

J) inserting the shaft of the awl through the holes in the ears of the clamp; and K) withdrawing the awl from the ears of the clamp after step F and before step G.

13. The method recited in claim 12 further comprising the step of:

L) aligning the holes in the ears of the clamp by moving the awl until the awl is freely movable through both of the holes and before step K.

14. The method recited in claim 13 wherein step F includes the steps of:

M) providing the tool with means for adjustably imposing a minimum spatial limit between the jaws such that compression of the jaws to substantially the spatial limit releasably locks the jaws in place at substantially the spatial limit;

N) setting the jaws of the tool to a minimum spatial limit; and

O) compressing the jaws to substantially the minimum spatial limit, thereby locking the jaws in place.

15. The method recited in claim 14 further comprising removing the installed fastener by the steps of:

P) loosening the threaded member of the fastener to permit the fastener to move laterally within the ears of the clamp and dispose the head and the threaded member spaced away from respective jaws of the tool; and then Q) placing the first jaw of the tool on the outer surface of the first ear and the second jaw on the outer surface of the second ear such that the ears lie between the jaws and the head of the threaded member is outwardly of respective jaws; and then R) working the jaws back and forth while pushing the jaws further onto the ears until the jaws have made a purchase thereon sufficient to remain in place; and then S) compressing the jaws of the tool so as to hold the ears of the clamp in place; and then T) unfastening the threaded member of the fastener and removing same from the ears of the clamp; and then U) releasing the jaws of the tool from the clamp and removing the tool from the clamp.

16. The method recited in claim 14 wherein:

step A includes the step of V) providing another clamp with a pair of spaced ears, each ear having a centrally-located hole; and wherein step G includes the step of W) inserting the fastener through the holes in the ears of another clamp as well as the holes in the ears of the clamp and threadedly securing the threaded member onto the threaded shaft of the fastener to hold the clamps in place.

17. The method recited in claim 12 wherein:

step A includes the step of V) providing another clamp with a pair of spaced ears, each ear having a centrally-located hole; and wherein step G includes the step of W) inserting the fastener through the holes in the ears of another clamp as well as the holes in the ears of the clamp and threadedly securing the threaded member onto the threaded shaft of the fastener to hold the clamps in place.

18. The method recited in claim 11 further comprising removing the installed fastener by the steps of:

P) loosening the threaded member of the fastener to permit the fastener to move laterally within the ears of the clamp and dispose the head and the threaded member spaced away from respective jaws of the tool; and then Q) placing the first jaw of the tool on the outer surface of the first ear and the second jaw on the outer surface of the second ear such that the ears lie between the jaws and the head and the threaded member are outwardly of respective jaws; and then R) working the jaws back and forth while pushing the jaws further onto the ears until the jaws have made a purchase thereon sufficient to remain in place;

S) compressing the jaws of the tool so as to hold the ears of the clamp in place; and then T) unfastening the fastener and removing same from the ears of the clamp: and then U) releasing the jaws of the tool from the clamp and removing the tool from the clamp.

19. The method recited in claim 11 wherein step C includes the step of:

X) providing the tool with jaws positioned at an angle between approximately zero and ninety degrees relative to the handles.

* * * * *